United States Patent [19]

Konishi

[11] Patent Number: 5,764,751
[45] Date of Patent: Jun. 9, 1998

[54] PORTABLE TELEPHONE SET WITH A VIBRATOR HAVING AN AUTOMATIC SWITCHING FUNCTION

[75] Inventor: Osamu Konishi, Tokyo, Japan

[73] Assignee: NEC Corporation, Tokyo, Japan

[21] Appl. No.: 654,427

[22] Filed: May 28, 1996

[30] Foreign Application Priority Data

Jun. 1, 1995 [JP] Japan .................. 7-134966

[51] Int. Cl.⁶ .................. H04M 3/00
[52] U.S. Cl. .................. 379/373; 379/374; 379/418; 379/420; 381/71; 381/164
[58] Field of Search .................. 379/373, 374, 379/390, 388, 389, 58, 185, 179, 418, 420, 375; 381/71, 94, 101, 102, 164, 107

[56] References Cited

U.S. PATENT DOCUMENTS

| | | | |
|---|---|---|---|
| 3,665,112 | 5/1972 | Blake et al. | 379/156 |
| 5,615,256 | 3/1997 | Yamashita | 379/358 |
| 5,617,468 | 4/1997 | Nojima et al. | 379/58 |
| 5,617,472 | 4/1997 | Yoshida et al. | 379/390 |

FOREIGN PATENT DOCUMENTS

4-137929  5/1992  Japan.

*Primary Examiner*—Krista Zele
*Assistant Examiner*—Jacques M. Saint-Surin
*Attorney, Agent, or Firm*—Young & Thompson

[57] ABSTRACT

In a portable telephone set comprising a receiver for generating an audible tone, a vibrator for vibrating the portable telephone set mechanically, and a radio section for receiving an incoming call signal to produce a call detection signal, a transmitter microphone senses, in cooperation with a voice processing section, ambient sounds to produce an ambient sound level signal. In cooperation with a main control section, a vibrator control section selectively activates, in response to the call detection signal, one of the receiver and the vibrator with reference to the ambient sound level signal. When the level is not more than a predetermined level, the vibrator control section drive the vibrator to make the vibrator vibrate mechanically without generation of the audible tone. Otherwise, the vibrator control section makes the receiver generate the audible tone.

23 Claims, 4 Drawing Sheets

PORTABLE TELEPHONE SET WITH A VIBRATOR HAVING AN AUTOMATIC SWITCHING FUNCTION

BACKGROUND OF THE INVENTION

This invention relates to a portable telephone set and, more particularly, to a portable telephone set with a vibrating element.

A conventional portable telephone set of the type described is disclosed in Japanese Unexamined Patent Prepublication of Kokai No. Hei 4-137,929 (137,929/1992) for Japanese Patent Application No. 260,922 of 1990. The portable telephone set according to Kokai No. Hei 4-137, 929 comprises a tone generating section for generating an audible tone, a vibrating section for vibrating the portable telephone set mechanically, a receiving section for receiving an incoming call signal to produce a call detection signal on reception of the incoming call signal, a mode selection unit for manually setting, as an incoming call operation mode (an announce mode), one of an audible tone mode and a vibration mode, and a control circuit for selectively activating, in response to the call detection signal, one of the tone generating section and the vibrating section on the basis of the incoming call operation mode.

That is, the control circuit makes the tone generating section generate the audible tone when the audible tone mode is set as the incoming call operation mode. The control circuit makes the vibrating section vibrate mechanically when the vibration mode is set as the incoming call operation mode. At any rate, the conventional portable telephone set comprises, as announce sections, the tone generating section and the vibrating section which are manually switched.

Inasmuch as, in the conventional portable telephone set, the tone generating section and the vibrating section are manually switched, a user of the conventional portable telephone set must carry out a complicated switching operation in accordance with surrounding circumstances. In addition, the conventional portable telephone set is disadvantageous in that the incoming call is not necessarily announced by a desired announce section if the user forgets the switching operation. Furthermore, the conventional portable telephone set is disadvantageous in that its possessor does not notice the incoming call if it is left on a desk or it is put in a bag with the vibration mode set as the announce mode. The conventional portable telephone set is disadvantageous in that surrounding persons are disturbed if the user suddenly answers the incoming call.

SUMMARY OF THE INVENTION

It is therefore an object of this invention to provide a portable telephone set which is capable of automatically announcing an incoming call by a vibration without generation of an audible tone in a quiet place on upon receipt of the incoming call.

It is another object of this invention to provide a portable telephone set of the type described, which is capable of announcing an incoming call by automatically switching from the vibration to generation of the audible tone after an elapse of a predetermined time interval.

It is still another object of this invention to provide a portable telephone set of the type described, in which bystanders are not disturbed.

Other objects of this invention will become clear as the description proceeds.

According to an aspect of this invention, a portable telephone set comprises tone generating means for generating an audible tone. Vibrating means vibrates the portable telephone set mechanically. Sensing means senses surrounding noises to produce a noise level signal based on a level of the surrounding noises. Receiving means receives an incoming call signal to produce a call detection signal on reception of the incoming call signal. Connected to the receiving means, the tone generating means, the vibrating means, and the sensing means, control means selectively activates, in response to the call detection signal, one of the tone generating means and the vibrating means with reference to the noise level signal.

A method to which this invention is applicable is that of controlling an incoming call operation in a portable telephone set which comprises tone generating means for generating an audible tone, vibrating means for vibrating the portable telephone set mechanically, sensing means for sensing surrounding noises to produce a noise level signal based on a level of the surrounding noises, and receiving means for receiving an incoming call signal to produce a call detection signal on reception of the incoming call signal. According to an aspect of this invention, the method comprises the steps of: comparing the noise level with a predetermined level in response to the call detection signal; and making the vibrating means mechanically vibrate without generation of the audible tone when the noise level is not more than the predetermined level.

A method to which this invention is applicable is of controlling an incoming call operation in a portable telephone set which comprises tone generating means for generating an audible tone, vibrating means for vibrating the portable telephone set, sensing means for sensing surrounding noises to produce a noise level signal indicative of a noise level of the surrounding noises, mode setting means for setting, as an operation mode, one of a normal mode and an automatic switching mode, and receiving means for receiving an incoming call signal to produce a call detection signal on reception of the incoming call signal. According to another aspect of this invention, the method comprises the steps of: determining whether the portable telephone set is set in the normal mode or in the automatic switching mode in response to the call detection signal; comparing the noise level with a predetermined level when the portable telephone set is set in the automatic switching mode as the operation mode; and making the vibrating means mechanically vibrate without generation of the audible tone when the noise level is not more than the predetermined level.

DESCRIPTION OF THE PREFERRED EMBODIMENTS

Figure 1:
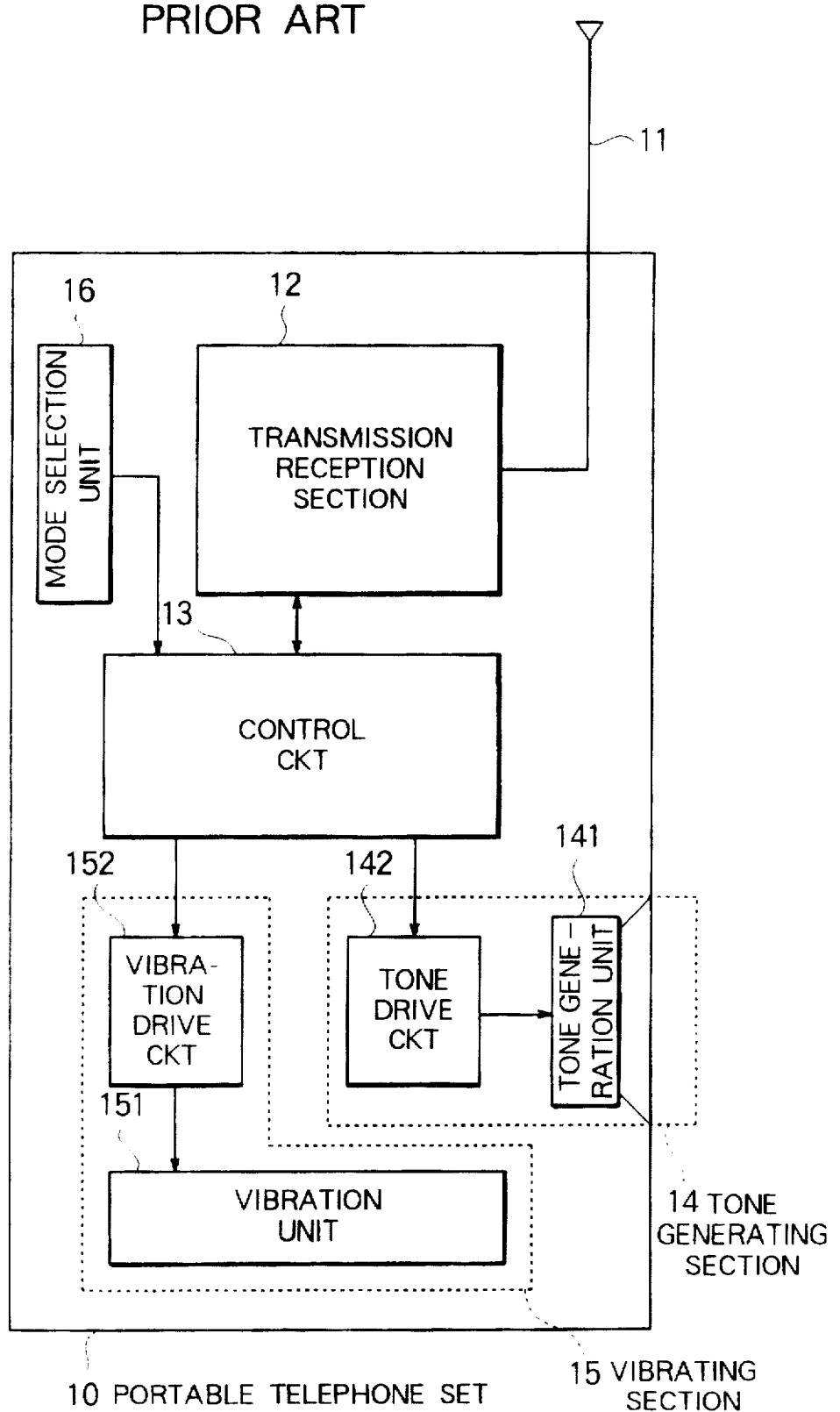
FIG. 1 is a block diagram of a conventional portable telephone set.

Referring to FIG. 1, a conventional portable telephone set 10 will be described in order to facilitate an understanding of this invention. The illustrated portable telephone set 10 is disclosed in the above-mentioned Japanese Unexamined Patent Prepublication of Kokai No. Hei 4-137,929.

The portable telephone set 10 comprises an antenna 11 for transmitting and receiving a radio wave, a transmission reception section 12 connected to the antenna 11, a control circuit 13 connected to the transmission reception section 12, a tone generating section 14 connected to the control circuit 13, a vibrating section 15 connected to the control circuit 13, and a mode selection unit 16 connected to the control circuit 13.

The tone generating section 14 comprises a tone generation unit 141 for generating an audible tone and a tone drive circuit 142 for driving the tone generation unit 141 in response to a tone start signal from the control circuit 13. The vibrating section 15 comprises a vibration unit 151 for vibrating the portable telephone set 10 mechanically and a vibration drive circuit 152 for driving the vibration unit 151 in response to a vibration start signal from the control circuit 13.

When the transmission reception section 12 receives an incoming call signal via the antenna 11, the transmission reception section 12 sends a call detection signal to the control circuit. 13. The mode selection unit 16 is for manually setting, as an incoming call operation mode (an announce mode), one of an audible tone mode and a vibration mode by a user of the portable telephone set 10.

The control circuit 13 selectively activate, in response to the call detection signal, one of the tone generating section 14 and the vibrating section 15 on the basis of the incoming call operation mode. More specifically, the control circuit 13 gives, in response to the call detection signal, the tone start signal to the tone drive circuit 142 to make the tone generation unit generate the audible tone when the audible tone mode is selected as the incoming call operation mode by the mode selection unit 16. On the other hand, the control circuit 13 gives, in response to the call detection signal, the vibration start signal to the vibration drive circuit 152 to make the vibration unit 151 vibrate the portable telephone set 10 mechanically when the vibration mode is selected as the incoming call operation mode by the mode selection unit 16.

At any rate, the portable telephone set 10 comprises, as announce sections, the tone generating section 14 and the vibrating section 15 which are manually switched. It is possible to inform the user of the incoming call soundlessly in a case where generation of the audible tone is undesirable.

With this structure, the user of the portable telephone set 10 must carry out a complicated switching operation in accordance with surrounding circumstances because the tone generating section 14 and the vibrating section 15 are manually switched in the portable telephone set 10, as mentioned in the preamble of the instant specification. In addition, the portable telephone set 10 is disadvantageous in that the incoming call is not necessarily announced appropriately if the user forgets the switching operation, as also mentioned in the preamble of the instant specification. Furthermore, the portable telephone set 10 is disadvantageous in that its possessor does not notice the incoming call if it is left on a desk or is put in a bag with the vibration mode set as the announce mode, as further mentioned in the preamble of the instant specification. The portable telephone set 10 is disadvantageous in that surrounding persons are disturbed if the user suddenly answers the incoming call, as mentioned in the preamble of the instant specification.

Figure 2:
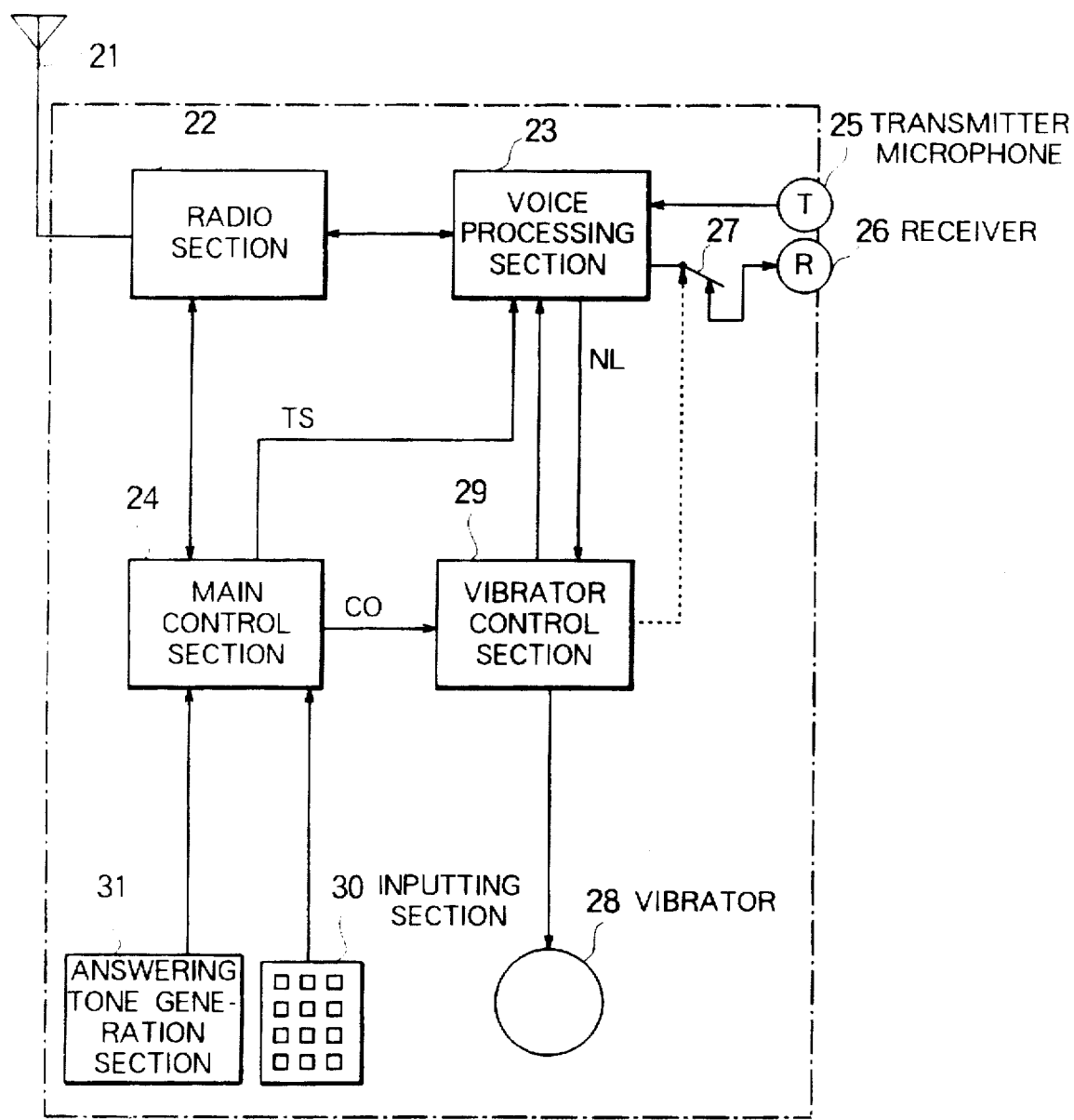
FIG. 2 is a block diagram of a portable telephone set according to a preferred embodiment of this invention.

Referring to FIG. 2, the description will proceed to a portable telephone set 20 according to a preferred embodiment of this invention. The illustrated portable telephone set 20 receives an incoming call signal and a reception voice signal which are transmitted as an input radio signal from a base station (not shown). In addition, the portable telephone set transmits a transmission voice signal and an answering tone signal as an output radio signal to the base station.

The portable telephone set 20 comprises an antenna 21 for transmitting the output radio signal and for receiving the input radio signal, a radio section 22 connected to the antenna 21, a voice processing section 23 connected to the radio section 22, a main control section 24 for controlling the radio section and the voice processing section 23, a transmitter microphone 25 connected to the voice processing section 23, a receiver 26 connected to the voice processing section 23 through a switch 27, a vibrator 28, a vibrator control section 29 connected to the voice processing section 23 for controlling the vibrator 28 and the switch 27, an inputting section 30 connected to the main section 24, and an answering tone generation section 31 connected to the main control section 24.

The radio section 22 demodulates and amplifies the input radio signal into a demodulated signal. The demodulated signal is either the incoming call signal or the reception voice signal. When the radio section 22 receives the incoming call signal as the input radio signal, the radio section 22 sends a call detection signal to the main control section 24. That is, the radio section 22 serves as a receiving arrangement for receiving the incoming call signal to produce the call detection signal on reception of the incoming call signal. When the radio section 22 receives the reception voice signal as the demodulated signal, the radio section 22 supplies the reception voice signal to the voice processing section 23.

Figure 3:
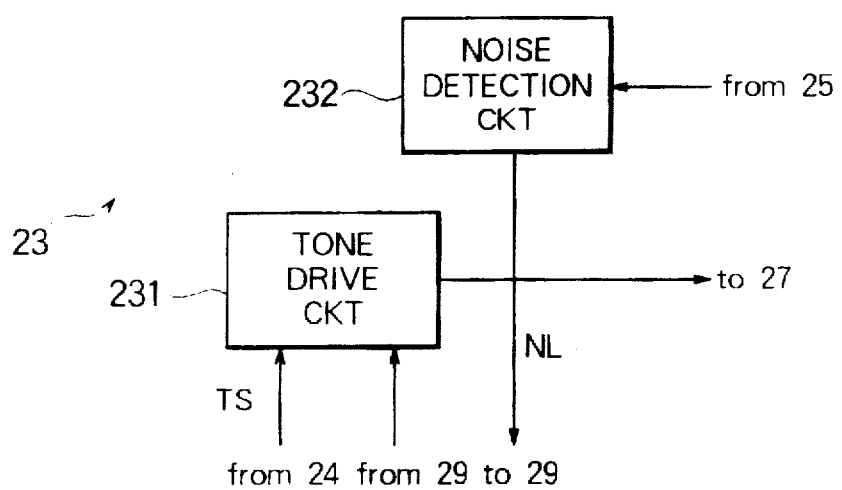
FIG. 3 is a block diagram of a voice processing section for use in the portable telephone set illustrated in FIG. 2.

The voice processing section 23 sends the reception voice signal to the receiver 26 via the switch 27. The receiver 26 converts the reception voice signal into an output voice sound. The voice processing section 23 includes a tone drive circuit 231 as shown in FIG. 3. The tone drive circuit 231 has a normal volume and a quiet volume lower than the normal volume. Responsive to a tone start signal Ts from the main control section 24, the tone drive circuit 231 drives the receiver 26 to make the receiver 26 generate an audible tone with the normal volume. That is, the receiver 26 serves in cooperation with the tone drive circuit 231 as a tone generating arrangement for generating the audible tone.

The transmitter microphone 25 converts an input voice sound into a transmission voice signal. The transmission voice signal is supplied with the voice processing section 23. The voice processing section 23 sends the transmission voice signal to the radio section 22. The radio section 22 modulates a carrier with the transmission voice signal into a modulated signal and amplifies the modulated signal into the output radio signal. In addition, the transmitter microphone 25 converts surrounding noises into a noise signal. The noise signal is supplied to the voice processing section 23.

As shown in FIG. 3, the voice processing section 23 includes a noise detection circuit 232 for detecting the noise signal to produce a noise level signal NL indicative of a noise level of the surrounding noises. That is, the transmitter microphone 25 acts in cooperation with the noise detection circuit 232 as a sensing arrangement for sensing the surrounding noises to produce the noise level signal NL.

The vibrator 28 vibrates the portable telephone set 20 mechanically. Responsive to a control signal CO from the main control section 24, the vibrator control section 29 controls the vibrator 28 and the switch 27 with reference to the noise level signal NL. In other words, the vibrator control section 29 selectively activates one of the receiver 26 and the vibrator with reference to the noise level signal NL, in the manner which will become clear. At any rate, the vibrator control section 29 serves in cooperation with the main control section 24 as a control arrangement for selectively activating, in response to the call detection signal, one of the receiver 26 and the vibrator 28 with reference to the noise level signal.

The inputting section 30 inputs a dial number. In addition, the input section 30 acts as a mode setting arrangement for setting, as an operation mode, one of a normal mode and an automatic switching mode. When the automatic switching mode is set as the operation mode, the control arrangement carries out a selective activating operation for the receiver 26 and the vibrator 28.

The answering tone generation section 31 generates an answering tone signal indicative of an answering tone when a user of the portable telephone set 20 carries out a response operation. When the main control section 24 receives the answering tone signal, the main control section 24 transmits the answering tone signal as the output radio signal to an outgoing caller (not shown) through the radio section 22 and the antenna 21.

Figure 4:
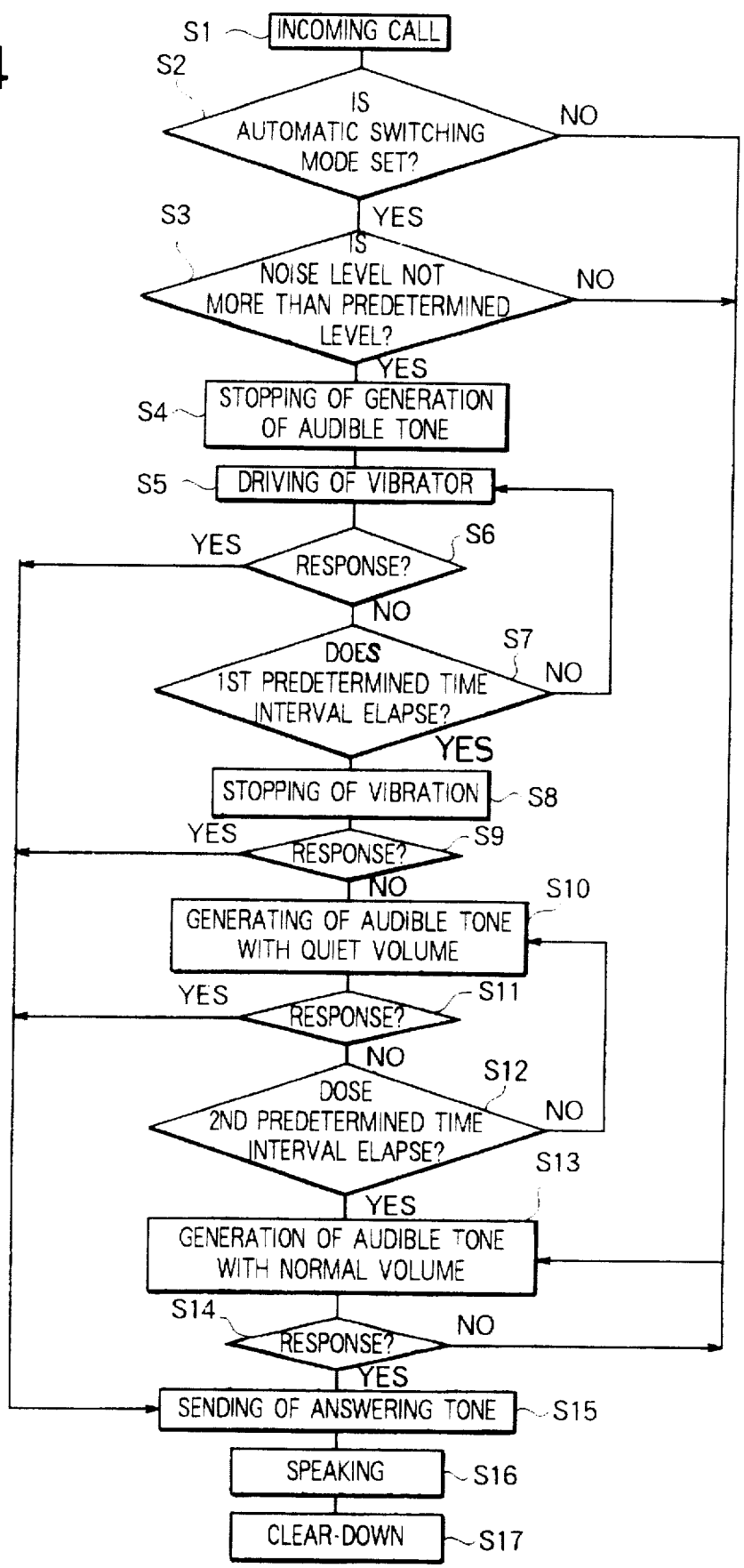
FIG. 4 shows a flow chart for use in describing operation of the portable telephone set illustrated in FIG. 2.

Referring to FIG. 4, description will proceed to operation of the portable telephone set 20 illustrated in FIG. 2. It will be assumed that the incoming call signal is transmitted as the input radio signal from the outgoing caller via the base station to the portable telephone set 20.

The radio section 22 demodulates the input radio signal into the incoming call signal. The radio section 22 sends the call detection signal to the main control section 24 as a first step S1. Responsive to the call detection signal, the main control section 24 determines whether the portable telephone set 20 is set in the normal mode or in the automatic switching mode at a second step S2. When the portable telephone set is set in the automatic switching mode, the main control section 24 supplies the control signal CO to the vibrator control section 29 to activate the vibrator control section 29. The vibrator control section 29 compares the noise level NL with a predetermined level at a third step S3. When the noise level NL is not more than the predetermined level, the third step S3 is followed by a fourth step S4 at which the vibrator control section 29 sends an incoming call tone stop signal to the switch 27 to turn off the switch 27. As a result, generation of the audible tone stops. The fourth step S4 is succeeded by a fifth step S5 at which the vibrator control section 29 sends a vibrator start signal to the vibrator 28 to make the vibrator 28 vibrate the portable telephone set 20 mechanically.

The fifth step S5 proceeds to a sixth step S6 at which the vibrator control section 29 determines whether or not the possessor of the portable telephone set 20 carries out a response operation. When the possessor of the portable telephone set 20 does not carry out the response operation, the sixth step S6 is followed by a seventh step S7 at which the vibrator control section 29 determines whether or not a first predetermined time interval elapses since the incoming call signal is received. When the first predetermined time interval does not elapse, the seventh step S7 turns back to the fifth step S5. After an elapse of the first predetermined time interval, the seventh step S7 is succeeded by an eighth step S8 at which the vibrator control section 29 stops mechanical vibration by the vibrator 28. The eight step S8 proceeds to a ninth step S9 at which the vibrator control section 29 determines whether or not the possessor of the portable telephone set 20 carries out a response operation. When the possessor of the portable telephone set 20 does not carry out the response operation, the ninth step S9 is followed by a tenth step S10 at which the vibrator control section 29 makes the switch 27 turn on and sends a quiet tone start signal to the tone drive circuit 231 to make the receiver 26 generate the audible tone with the quiet volume.

The tenth step S10 proceeds to an eleventh step S11 at which the vibrator control section 29 determines whether or not the possessor of the portable telephone set 20 carries out a response operation. When the possessor of the portable telephone set 20 does not carry out the response operation, the eleventh step S11 is followed by a twelfth step S12 at which the vibrator control section 29 determines whether or not a second predetermined time interval, which is longer than the first predetermined time interval, elapses since the incoming call signal is received. When the second predetermined time interval does not elapse, the twelfth step S12 turns back to the tenth step S10. After an elapse of the second predetermined time interval, the twelfth step S12 is succeeded by a thirteenth step S13 at which the vibrator control section 29 sends a normal tone start signal to the tone drive circuit 231 to make the receiver 26 generate the audible tone with the normal volume.

The thirteenth step S13 proceeds to a fourteenth step S14 at which the vibrator control section 29 determines whether or not the possessor of the portable telephone set 20 carries out a response operation. When the possessor of the portable telephone set 20 does not carry out the response operation, the fourteenth step S14 turns back to the thirteenth step S13.

At the second step S2, when the portable telephone set is set in the normal mode, the second step S2 turns to the thirteenth step S13. At the third step S3, when the noise level NL is more than the predetermined level, the third step S3 turns to the thirteenth step S13.

At the sixth, the ninth, the eleventh, and the fourteenth steps S6, S9, S11, and S14, when the possessor of the portable telephone set 20 carries out the response operation, operation turns to a fifteenth step S15 at which the main control section 24 activates the answering tone generation section 31 to make the answering tone generation section 31 generate the answering tone signal. Thus, the answering tone signal is transmitted from the possessor to the outgoing caller. The fifteenth step S15 is followed by a sixteenth step S16 at which speaking or conversation is carried out between the possessor and the outgoing caller. The sixteenth step S16 is succeeded by a seventeenth step S17 at which clear-down is carried out.

While this invention has thus far been described in conjunction with a preferred embodiment thereof, it will readily be possible for those skilled in the art to put this invention into practice in various other manners. For example, the second step S2 may be omitted. In addition, the seventh through the twelfth steps S7 to S12 may be omitted. Furthermore, the fifteenth step S15 may be omitted.

What is claimed is:

1. A portable telephone set comprising:

tone generating means for generating an audible tone;

vibrating means for mechanically vibrating said portable telephone set;

sensing means for sensing ambient sound and producing a signal indicative of a level of the ambient sound;

receiving means for receiving an incoming call signal to produce a call detection signal on reception of the incoming call signal; and control means, connected to said receiving means, said tone generating means, said vibrating means, and said sensing means, for selectively activating, in response to the call detection signal, one of said tone generating means and said vibrating means with reference to the noise level signal, the control means comprising:

means for comparing the ambient sound level with a predetermined level; and means for making said vibrating means mechanically vibrate without generation of the audible tone when the ambient sound level is not more than the predetermined level.

2. A portable telephone set as claimed in claim 1, further comprising mode setting means, connected to said control means, for setting, as an operation mode, one of a normal mode and an automatic switching mode, said control means carrying out a selective activating operation for said tone generating means and said vibrating means when the automatic switching mode is set as the operation mode.

3. A portable telephone set as claimed in claim 1, wherein said tone generating means has a normal volume and a quiet volume lower than the normal volume, said control means further comprising:

means for determining whether or not a first predetermined time interval has elapsed since the incoming call signal is received; and means for making said tone generating means generate the audible tone with the quiet volume with said vibrating means turned off after the first predetermined time interval has elapsed.

4. A portable telephone set as claimed in claim 3, wherein said control means further comprises:

means for determining whether or not a second predetermined time interval has elapsed since the incoming call signal was received, the second predetermined time interval being longer than the first predetermined time interval; and means for making said tone generating means generate the audible tone with the normal volume after the second predetermined time interval has elapsed.

5. A portable telephone set as claimed in claim 1, further comprising answering tone generating means for transmitting an answering tone signal indicative of an answering tone to an outgoing caller when a user of said portable telephone set carries out a response operation.

6. A method of controlling an incoming call operation in a portable telephone set comprising tone generating means for generating an audible tone, vibrating means for mechanically vibrating said portable telephone set, sensing means for sensing ambient sound and producing a signal indicative of a level of the ambient sound, and receiving means for receiving an incoming call signal to produce a call detection signal on reception of the incoming call signal, said method comprising the steps of:

comparing the ambient sound level with a predetermined level in response to the call detection signal; and making said vibrating means mechanically vibrate without generation of the audible tone when the ambient sound level is not more than the predetermined level.

7. A method as claimed in claim 6, said method further comprising the step of transmitting an answering tone signal indicative of an answering tone to an outgoing caller when a possessor of said portable telephone set carries out a response operation.

8. A method as claimed in claim 6, said method further comprising the step of making said tone generating means generate the audible tone when the ambient sound level is more than the predetermined level.

9. A method as claimed in claim 8, further comprising the step of transmitting an answering tone signal indicative of an answering tone to an outgoing caller when a possessor of said portable telephone set carries out a response operation.

10. A method as claimed in claim 6, said tone generating means having a normal volume and a quiet volume lower than the normal volume, wherein said method further comprises the steps of:

determining whether or not a first predetermined time interval has elapsed since the incoming call signal is received; and making said tone generating means generate the audible tone with the quiet volume with said vibrating means turned off after the first predetermined time interval has elapsed.

11. A method as claimed in claim 10, further comprising the step of transmitting an answering tone signal indicative of an answering tone to an outgoing caller when a user of said portable telephone set carries out a response operation.

12. A method as claimed in claim 10, further comprising the steps of:

determining whether or not a second predetermined time interval has elapsed since the incoming call signal was received, the second predetermined time interval being longer than the first predetermined time interval; and making said tone generating means generate the audible tone with the normal volume after the second predetermined time interval has elapsed.

13. A method as claimed in claim 12, further comprising the step of transmitting an answering tone signal indicative of an answering tone to an outgoing caller when a user of said portable telephone set carries out a response operation.

14. A method of controlling an incoming call operation in a portable telephone set comprising tone generating means for generating an audible tone, vibrating means for mechanically vibrating said portable telephone set, sensing means for sensing ambient sound and producing a signal indicative of a level of the ambient sound, mode setting means for setting, as an operation mode, one of a normal mode and an automatic switching mode, and receiving means for receiving an incoming call signal to produce a call detection signal on reception of the incoming call signal, said method comprising the steps of:

determining whether said portable telephone set is set in the normal mode or in the automatic switching mode in response to the call detection signal;

comparing the ambient sound level with a predetermined level when said portable telephone set is set in the automatic switching mode as the operation mode; and making said vibrating means mechanically vibrate without generation of the audible tone when the ambient sound level is not more than the predetermined level.

15. A method as claimed in claim 14, further comprising the step of transmitting an answering tone signal indicative of an answering tone to an outgoing caller when a user of said portable telephone set carries out a response operation.

16. A method as claimed in claim 14, further comprising the step of making said tone generating means generate the audible tone when said portable telephone set is set in the normal mode as the operation mode.

17. A method as claimed in claim 16, further comprising the step of transmitting an answering tone signal indicative of an answering tone to an outgoing caller when a user of said portable telephone set carries out a response operation.

18. A method as claimed in claim 14, further comprising the step of making said tone generating means generate the audible tone when the ambient sound level is more than the predetermined level.

19. A method as claimed in claim 18, further comprising the step of transmitting an answering tone signal indicative of an answering tone to an outgoing caller when a possessor of said portable telephone set carries out a response operation.

20. A method as claimed in claim 14, said tone generating means having a normal volume and a quiet volume lower than the normal volume, wherein said method further comprises the steps of:

determining whether or not a first predetermined time interval has elapsed since the incoming call signal was received; and making said tone generating means generate the audible tone with the quiet volume with said vibrating means turned off after the first predetermined time interval has elapsed.

21. A method as claimed in claim 20, further comprising the step of transmitting an answering tone signal indicative of an answering tone to an outgoing caller when a user of said portable telephone set carries out a response operation.

22. A method as claimed in claim 20, further comprising the steps of:

determining whether or not a second predetermined time interval has elapsed since the incoming call signal was received, the second predetermined time interval being longer than the first predetermined time interval; and making said tone generating means generate the audible tone with the normal volume after the second predetermined time interval has elapsed.

23. A method as claimed in claim 22, further comprising the step of transmitting an answering tone signal indicative of an answering tone to an outgoing caller when a user of said portable telephone set carries out a response operation.

* * * * *